United States Patent
Davis

[15] 3,675,340
[45] July 11, 1972

[54] ELECTRO-MECHANICAL EDUCATIONAL APPARATUS

[72] Inventor: James E. Davis, 800 Evesham Avenue, Baltimore, Md. 21212

[22] Filed: May 27, 1970

[21] Appl. No.: 40,901

[52] U.S. Cl. ................................35/9 D, 35/73, 335/205
[51] Int. Cl. ..............................................G09b 1/10
[58] Field of Search ................35/9 D, 19 A, 73; 335/205

[56] References Cited

UNITED STATES PATENTS

| | | | |
|---|---|---|---|
| 2,410,746 | 11/1946 | Raettig | 335/205 |
| 2,492,571 | 12/1949 | Goldfarb | 35/9 D UX |
| 2,539,077 | 1/1951 | Hawkins | 35/9 D X |
| 2,853,799 | 9/1958 | Magnussen et al. | 35/9 D |
| 2,872,741 | 2/1959 | Krueger et al. | 35/9 D |
| 3,015,895 | 1/1962 | Stall | 35/9 D X |
| 3,137,079 | 6/1964 | Greuzard | 35/9 D |
| 3,380,176 | 4/1968 | Kling et al. | 35/73 X |
| 3,466,760 | 9/1969 | Vanek | 35/19 A |

Primary Examiner—Harland S. Skogquist
Attorney—John F. McClellan, Sr.

[57] ABSTRACT

An electro-mechanical educational apparatus in the form of a solid tablet representing one side of a house, complete with detachable windows, shutters, and windowboxes. Each detachable window contains a magnet embedded in a unique position with respect to the window outline and adapted to actuate a magnetic switch embedded in the house in a corresponding position at the correct location for the particular window. The correct sequence of assembly of the windows is indicated by line or color markings on the house, by colors of changeable components such as the shutters, or by colors, numerals, words, or other keys on the window boxes, which are to be matched with corresponding indications on the windows.

Correct assembly is verified by depression of a manual switch which actuates a light or a doorbell as a reward for the accomplishment. Means are provided to help students grasp the windows and to prevent upside down or mis-oriented insertion of the windows. Other means are provided to prevent students from removing indicators which are intended to be semi-fixed.

4 Claims, 6 Drawing Figures

INVENTOR
JAMES E. DAVIS

BY John F. McClellan Sr.
ATTORNEY

ELECTRO-MECHANICAL EDUCATIONAL APPARATUS

This invention relates generally to educational devices, and specifically to manipulative interlocking-piece assemblages adapted to reward the user with special signals when assembled correctly. Such assemblages are especially promising for instruction of young children, although by no means limited in capability to instruction of children.

Devices of the general type have been described in the prior art, but the tremendous educative potential inherent in this type instruction device has never been realized because of various deficiencies in the prior art apparatus involving safety, reliability, comprehendability and ease of manipulation.

Objects of the present invention therefore are to provide an improved electro-mechanical educational device of the type described which is easier to understand and to manipulate, safer electrically, more durable, more reliable in operation, and simpler and less expensive to construct, than prior art devices.

I embody my invention typically in a solid base having embedded therein completely supported and insulated circuitry including switch means operable by magnets embedded in informationally coded pieces adapted for insertion in appropriate recesses in the base according to a preferred assembly pattern, and means operable by the pieces and associated circuitry in the block for rewarding the user when assembly according to the preferred pattern is completed.

These and other advantages and objects of my invention will become more readily apparent on examination of the following description and of the drawings in which.

Figure 1:
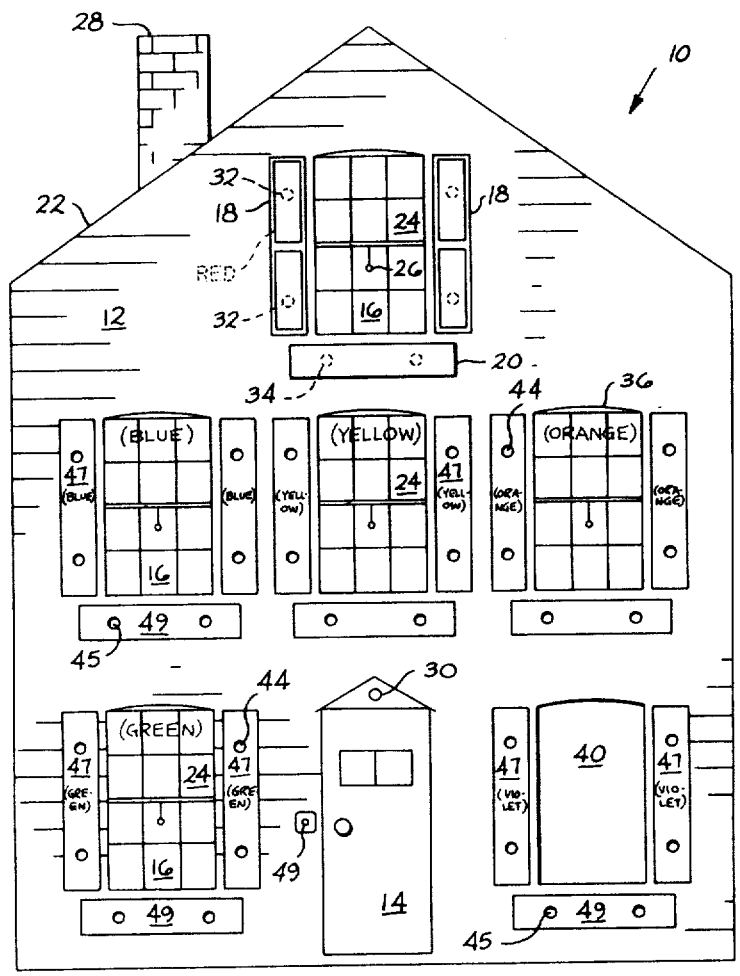
FIG. 1 is a perspective view of a preferred embodiment of this invention.

Now referring in detail to the individual FIGS., I show in FIG. 1 an assemblage 10 representing a preferred embodiment of my invention in the form of the wall 12 of a house. The house includes the usual exterior features which become familiar to children at an early age, a door 14, window-sashes or inserts 16, shutters 18, window boxes 20, a roof 22 and also shades 24 with pulls 26 painted in the windows, and a chimney 28 protruding from the roof. A lamp 30 is provided above the door.

The windows 16 are single inserts detachably fitted into recesses 40 in wall or base 12. The reverse facing sides of the window boxes and shutters are provided with spaced protrusions, dimensionally identical in size and spacing, indicated respectively at 34 and 32. These serve as plural inserts detachably fitting into matching spaced recesses 44 and 45 in the wall 12, and correct placement can be one of the pupil challenges.

Each window shade is of a different, bright, primary color from the other shades. All shutters are black, and all window boxes are white. When the shutters and window boxes are removed, colored areas 47, 49, indicate the color of the shade of the correct window insert to be placed at that location.

Figure 2:
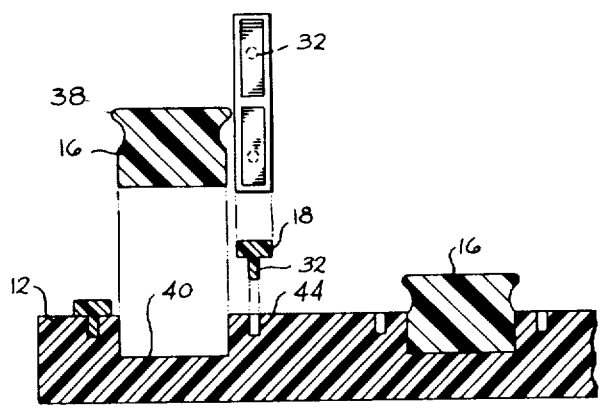
FIG. 2 is a section of a detail through the FIG. 1 embodiment.

FIG. 2 shows, in section, a detail making the window inserts easier to grasp, namely overhangs 38 in the portions of the window inserts 16 which protrude from the recesses 40 in the base 12. The overhangs, being larger than the recesses, also prevent "upside down" insertion of the members in the recesses. Shutter protrusions 32 and matching recesses 44 are also shown.

The object of this instructional apparatus is to teach pupils a number of skills by presenting them with an assembly problem or challenge in the form of the disassembled small parts together with base with empty recesses to receive the parts on assembly.

With little or no instruction, children who have learned to associate objects manipulatively will become interested in assembly of the various pieces in the base recesses. Experimentation by the pupil will lead to systematic correction of orientation of the windows so that the rounded ends 36 of the windows fit into the rounded ends of the recesses. The pupil will obtain a substantial satisfaction and sense of accomplishment on first assembling the apparatus to form a completed, recognizable "house"; in the process he will sharpen and develop his sensory and motor skills.

When the pupil has become so adept at assembling the apparatus that it no longer presents sufficient challenge (when he has "outgrown" it) a further stage of challenge in assembly of the same apparatus can be pointed out to him which will carry him to another plateau of learning.

The further stage of challenge requires not only proper insertion of the pieces in the base, but also proper sequencing of the inserted pieces to obtain a new and interesting reward.

As previously indicated, the required sequence is indicated by color-matching of the windows with the shutter area colors. For example, the upper left shutter area is colored blue, requiring matching the recess with the window insert having a blue shade; the upper center window insert is similarly yellow, requiring a window-insert match with a yellow shade, etc. When the parts of the entire sequence are correctly matched and inserted, the lamp 30 over the door 14 lights up when the doorbell switch 49 is pressed. Alternatively, a doorbell may be provided in place of the lamp. In either case, the circuit is again disconnected when pressure is removed from the switch, to conserve battery life.

Figure 3:
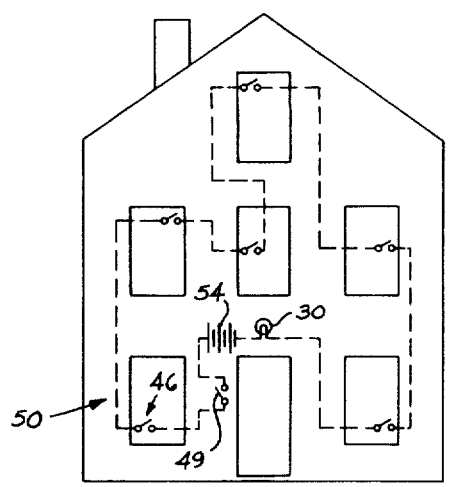
FIG. 3 is a wiring diagram.
Figure 4:
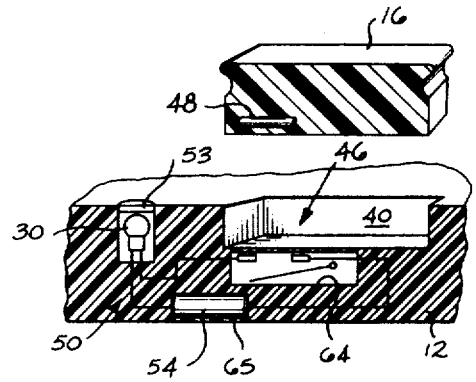
FIG. 4 is a diagrammatical perspective view in partial section.

FIGS. 3 and 4 diagrammatically show the wiring and switching arrangements for the sequencing circuit.

A magnetically actuable switch 46, is embedded in the base at each window recess in a unique position with respect to outline of each particular window recess. In a corresponding position in the appropriate insert for each window recess a magnet 48 is emplaced in a sealed cavity so that when the correct insert is placed in a particular recess the proximity of the magnet actuates the switch. The magnetic switches and the magnets are so chosen and related that unless the two are in the design relation the magnetic field is insufficient for actuation of the switch.

A series circuit 50 (FIG. 3) including lamp 30 and battery 54 is provided to insure that the illumination reward is withheld until all conditions of the challenge are met.

Alternatively, the circuit may be adapted for actuation by only one insert (FIG. 4) or by less than all inserts.

Figure 5:
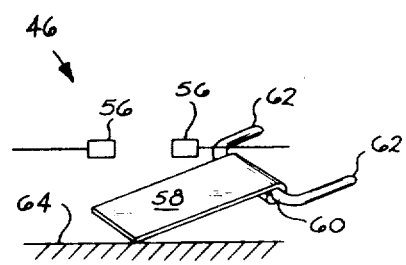
FIG. 5 is a perspective of a switch mechanism.

FIG. 5 shows the mechanism of one of the magnetic switches. Contacts 56 are bridged by ferrous link 58 when the link is swung about pivot 60, the free ends 62 of which are supportively embedded in the wall of the cavity containing the switch. The lower wall 64 of the cavity prevents the link from falling beyond range of the magnet. The switch mechanism shown is exemplary, but in any case a sealed switch is essential.

Figure 6:
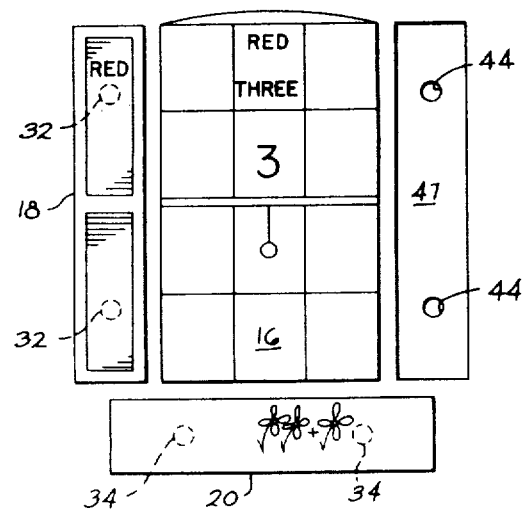
FIG. 6 shows alternative detailing of some of the parts shown in FIG. 1.

FIG. 6 shows alternative detailing of the various insert parts adapting the invention to different modes and levels of education.

For example, it will be appreciated from FIG. 2 that the shutters and the window boxes have no overhang which would permit easy grasping by a child. Removal can be made sufficiently difficult by providing tight fitting protrusions on the shutters and window boxes to preclude removal altogether by a child, in which case the instructor (or parent) will place the shutters and window boxes, using them as semi-fixed members. The FIG. 6 window box bears three plants, indicating that the appropriate window for insertion above it will bear some designation of three, for instance the number shown. The pupil will soon learn that a "plus" sign does not change the count whereas a minus sign does. Thus the fixed members or indicators can make proper assembly more difficult.

Alternatively, fixed indicators can be used to make assembly easier. FIG. 6 indicates this also, in that the fixed red shutter indicates that a matching (red) window insert is to be placed next to it. The correctness of the matching can be checked after the window insert is in place. This is in contrast to the arrangement described above, in which the match was indicated by colored areas under the window boxes and shutters, which colors were concealable by the overlying members, making checking much more difficult. In the one case it is much easier for the pupil during assembly of the apparatus to determine whether and where he made a mistake than in the other case.

A representative group of interchangeable instructional parts for use with the apparatus would be as follows:

set number one, used for teaching color matching, comprising six window inserts having individually different primary- or secondary-colored shades to be matched to colored shutter areas;

set number two, used for teaching number identification: comprising six window inserts having discrete numeral indications on the shades in the form of a flower or row of flowers, to be matched to a correspondingly marked set of window boxes placed as semi-fixed indicators by parent or other instructor; numerals 1, 2, 3, etc. may also be used in conjunction with this set;

set number three, used for teaching number combinations, comprising six window inserts marked on the shades with numerals to be matched appropriately with six window boxes correspondingly marked.

Further sets teaching simple addition and subtraction of numbers of flowers with the question indicated on the window box and the answer on the window insert, will provide students with easy lessons in arithmetic. Additionally, sets may be provided with arithmetic questions and answers using numerals, and also using spelled-out numerals such as "one."

Colored shutters can be used to teach matching words, for example a set of green shutters will require a window insert with the word "green" on the shade for proper matching.

Instructional possibilities are almost limitless using my invention.

Material chosen for the apparatus is preferably solid structural-grade plastic such as high density polyethylene, bearing bright colors. The electric light bulb is preferably recessed, and may be covered by clear plastic 53, FIG. 4. The battery is also completely encased behind a removable plug containing it in the assembly as at 65, FIG. 4.

The base is preferably a two-plate solidly cemented together tablet with the circuitry completely embedded in the plates; the inserts are unitary except for the magnets which are inserted in later-plugged bores.

It can thus be seen that the apparatus is very versatile while at the same time very rugged—a combination nowhere found in the prior art structures, which typically depend for versatility on agglomerations of reconnectable small parts contained in hollow structures poorly adapted for load bearing and hard knocks. Fire and shock hazards and the danger of ingestion of small parts are minimized by the embedding technique of construction, which also presents only smoothly finished plastic edges to the hands (and feet) of pupils.

Obviously many modifications and variations of the present invention are possible in light of the above teachings. It is, therefore, to be understood that within the scope of the appended claims the invention may be practiced otherwise than as specifically described.

I claim:

1. Electro-mechanical educational apparatus comprising: base means including a solid tablet in the outline shape of a house, with a substantially flat face having a plurality of sets of recesses therein; one of said sets of recesses being identical in outline, indicating window locations, with one side of each said identical recess having a different shape from the other sides; a magnetic switch embedded adjacent a portion of each recess of said identical set of recesses at a position unique to that recess, plural sets of means for insertion into said sets of recesses, with each means for insertion into said window location recesses being an interchangeable window-marked means adapted to fit all said window location recesses; a magnet embedded in each of said window-marked means at a position adapted to actuate one of said uniquely positioned magnetic switches on insertion into the appropriate recess; means for indicating a predetermined sequence of assembly; means for signalling completion of assembly according to said predetermined sequence, including a series electric circuit embedded in the tablet, connecting the magnetic switches; a shutter area on each side of plural of the window locations with spaced recesses in each said shutter area, and plural shutters respectively having spaced protrusions to fit the spaced recesses for thereby mounting the shutters on the tablet proximate the window locations.

2. Apparatus as recited in claim 1, wherein the means for indicating a predetermined sequence of assembly comprises discrete markings on said respective shutter areas, and wherein the window inserts have discrete markings corresponding to one of the shutter area discrete markings.

3. Apparatus as recited in claim 1, a window box area beneath each of plural of the window locations with additional spaced recesses therein identical to the first said spaced recesses, plural window boxes respectively having spaced protrusions to fit the spaced recesses for thereby mounting the window boxes on the tablet beneath the window locations, a discrete marking on each window box, and a corresponding discrete marking on each respective window insert.

4. Apparatus as recited in claim 3, wherein the representation of a house includes a door representation; wherein the electric circuit includes a manually operable switch proximate the door representation, and an electrically actuable signal device in series with said electric circuit and switch.

* * * * *